United States Patent [19]

van der Lely

[11] 4,164,259

[45] Aug. 14, 1979

[54] SOIL CULTIVATING IMPLEMENTS

[76] Inventor: Cornelis van der Lely, 7, Brüschenrain, Zug, Switzerland

[21] Appl. No.: 854,372

[22] Filed: Nov. 23, 1977

[30] Foreign Application Priority Data

Nov. 29, 1976 [NL] Netherlands .................. 7613259

[51] Int. Cl.² ........................................ A01B 33/06
[52] U.S. Cl. ........................................ 172/59; 172/96
[58] Field of Search .................. 172/59, 96, 111, 71, 172/526, 527, 522, 523

[56] References Cited

U.S. PATENT DOCUMENTS

| 2,559,048 | 7/1951 | Seaman | 172/96 |
|---|---|---|---|
| 2,807,104 | 9/1957 | Maxey | 172/96 |
| 3,150,721 | 9/1964 | Lely | 172/96 |
| 3,667,551 | 6/1972 | Lely | 172/59 |
| 3,783,948 | 1/1974 | Lely | 172/59 |
| 3,809,166 | 5/1974 | Lely | 172/59 |
| 3,897,831 | 8/1975 | Lely | 172/59 |
| 3,945,441 | 3/1976 | Lely | 172/59 |

FOREIGN PATENT DOCUMENTS

| 608051 | 9/1948 | United Kingdom | 172/71 |
|---|---|---|---|
| 618658 | 2/1949 | United Kingdom | 172/96 |

Primary Examiner—Richard J. Johnson
Attorney, Agent, or Firm—William B. Mason; Penrose Lucas Albright

[57] ABSTRACT

An implement has rotatable soil working members that include tines mounted on supports. Each support is formed by resilient interengaging strips that are clamped between an upper hub flange and a lower locking plate, the latter being connected to an upwardly extending driven shaft. The strips are bent to form rectilinear bases and outwardly extending arms of inner and outer pairs of strips. The outer ends of the arms are secured by respective upper and lower clamping plates which, together with the strip ends, form holders for tine fastening portions. When the soil working member is rotated about an axis defined by the shaft, the tines can deflect in directions tangential to the shaft and mitigate damage if any obstacle is encountered.

10 Claims, 6 Drawing Figures

SOIL CULTIVATING IMPLEMENTS

According to the invention, there is provided a soil cultivating implement of the kind set forth, wherein the or each carrier or support comprises a plurality of pairs of interengaging resilient strips.

For a better understanding of the invention, and to show how the same may be carried into effect, reference will now be made, by way of example, to the accompanying drawings in which.

Figure 1:
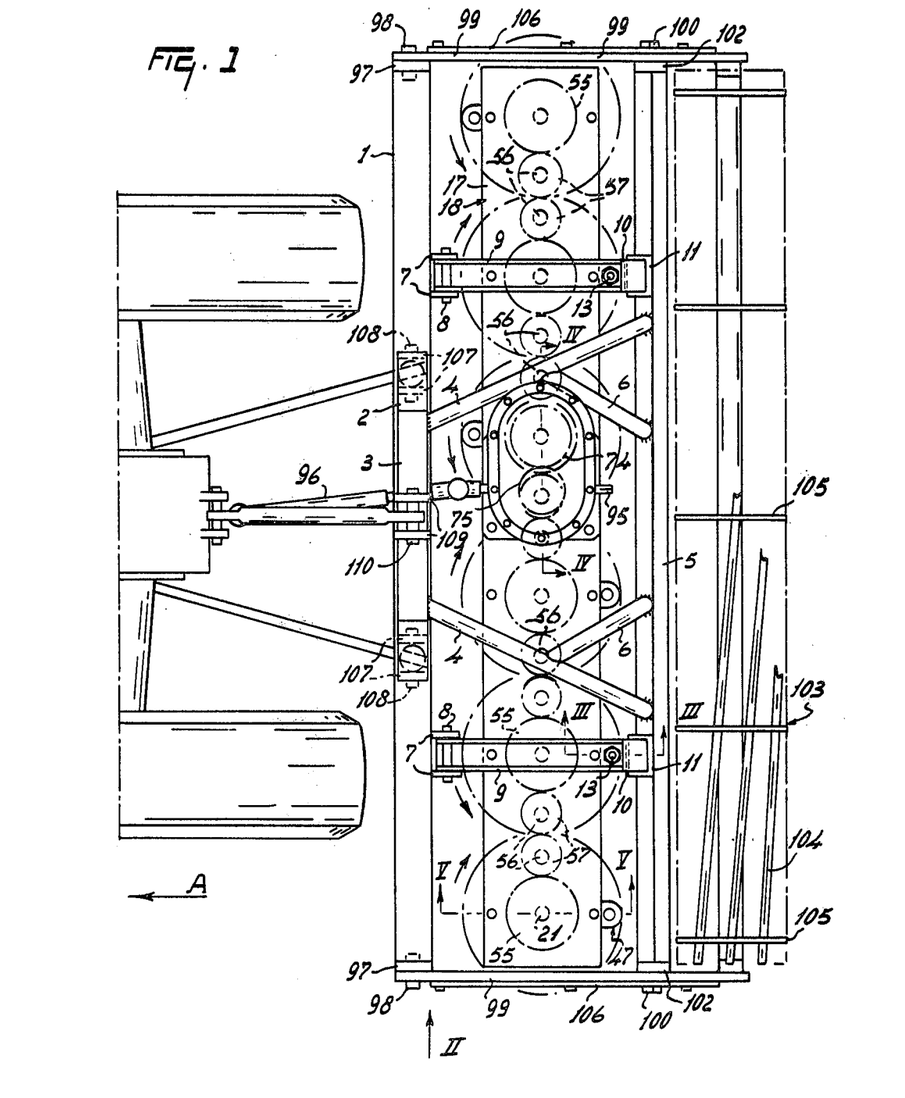
FIG. 1 is a plan view of a soil cultivating implement in accordance with the invention, in the form of a rotary harrow, connected to the rear of an agricultural tractor.
Figure 2:
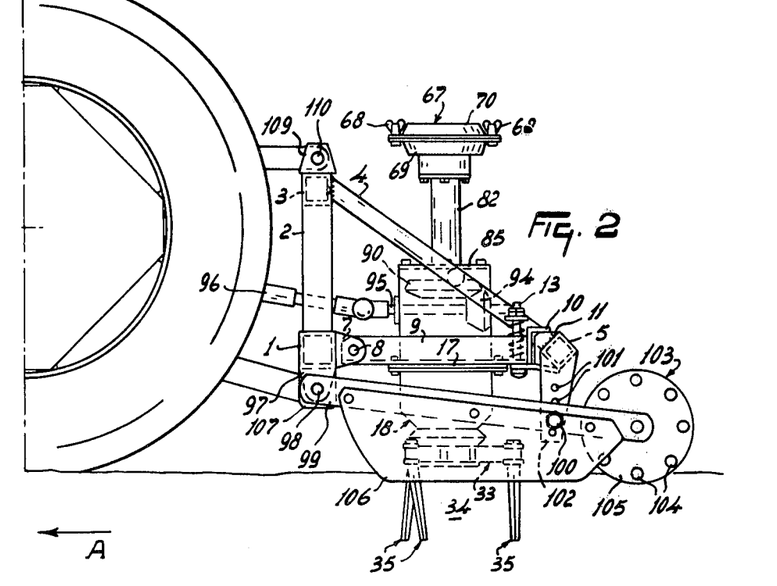
FIG. 2 is a side elevation as seen in the direction indicated by an arrow II in FIG. 1.
Figure 3:
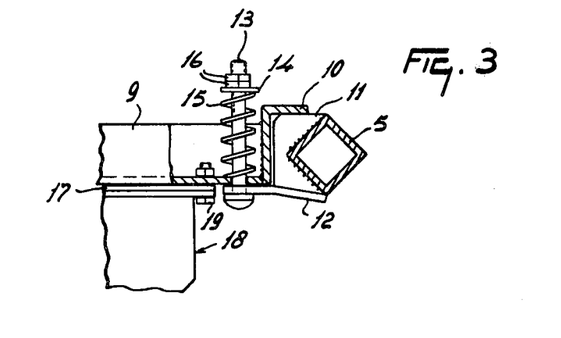
FIG. 3 is a section, to an enlarged scale, taken on the line III—III in FIG. 1.

Referring to FIGS. 1 to 6 of the accompanying drawings, the rotary harrow that is illustrated therein as an example of a soil cultivating implement in accordance with the invention has a frame which includes a substantially horizontal beam 1 that extends transverse, and usually as shown substantially perpendicular, to the intended direction of operative travel of the harrow that is indicated in FIGS. 1 and 2 of the drawings by an arrow A. The frame beam 1 has a polygonal cross-section which is preferably the square one that is illustrated in the drawings since that formation readily allows one flat external surface of the beam 1 to be horizontally or substantially horizontally disposed. Two beams 2 extend upwardly from the top of the beam 1 in gently convergent relationship at locations which are spaced by equal distances from the mid-point of the beam 1. The upper ends of the two beams 2 are rigidly interconnected by a beam 3 that extends substantially horizontally parallel to the beam 1. Two tie beams 4 diverge downwardly and rearwardly with respect to the direction A (see FIGS. 1 and 2 of the drawings) from locations that are adjacent to the opposite ends of the beam 3, the rearmost and lowermost ends of the beams 4 being rigidly secured to a frame beam 5 that is of substantially the same length as the frame beam 1 and that extends parallel or substantially parallel thereto at substantially the same horizontal level. The beam 5, like the beam 1, is of hollow formation and polygonal cross-section, the square crosssection that is illustrated in the drawings being preferred. It will be noted that the cross-sectional dimensions of the beam 5 are somewhat smaller than those of the beam 1 and that, when the preferred square cross-section that is illustrated is employed, said beam 5 is so disposed that one diagonal of its cross-section is substantially horizontal while the other is substantially vertical. Struts 6 strengthen the connections between the two tie beams 4 and the frame beam 5, said struts 6 being positioned at the relatively facing sides of the two tie beams 4 in the manner that is shown in FIG. 1 of the drawings.

Two pairs of lugs 7 project rearwardly from the back of the frame beam 1 at locations which are spaced by equal distances from the mid-point of that beam, said distances being substantially equal to one quarter of the length of the beam 1 and thus being greater than are the distances by which the lower ends of the beams 2 are spaced from said mid-point. Openings in the two lugs 7 of each pair carry corresponding pivot pins 8 in such positions that the two pivot pins 8 are substantially horizontally aligned in a direction that is parallel or substantially parallel to the longitudinal axes of the beams 1, 3 and 5. The leading ends, with respect to the direction A, of corresponding carriers 9 are turnably mounted on the two pivot pins 8 between the two lugs 7 of the respective pairs, each carrier 9 being in the form of a bar or beam of channel-shaped cross-section that is disposed with its web or base lowermost and its limbs projecting substantially vertically upwards therefrom. The rearmost end of each carrier 9, with respect to the direction A, has the substantially vertically disposed limb of a corresponding plate 10 of inverted L-shaped cross-section welded or otherwise rigidly secured to it. The substantially horizontally disposed limb of each plate 10 projects rearwardly with respect to the direction A from the upper edge of the substantially vertical limb concerned and acts as a stop for co-operation with a corresponding stop 11 that is rigidly secured to the frame beam 5 at an appropriate position axially along the length of the latter. The bottom of each stop 11 has a corresponding lug 12 (FIG. 3) rigidly secured to it so as to project forwardly therefrom to a location beneath the web or base of the respective channel cross-section carrier 9. Registering holes are formed in each lug 12 and the web or base of the corresponding carrier 9 where those two parts overlap and a bolt 13 is entered upwardly through the registering holes. A helical compression spring 15 is wound around the shank of each bolt 13 so as to bear between the upper surface of the web or base of the corresponding carrier 9 and a stop washer 14 that is mounted on said shank, towards the upper end thereof, in a position which is adjustable axially along the length of the bolt 13 by abutment against two co-operating lock nuts 16 that can be retained in desired axial positions along the length of the shank of the bolt 13 concerned. Clearly, the initial degree of compression of each spring 15 is dependent upon the position along the corresponding bolt shank that is adopted by the respective stop washer 14 after adjustment of the corresponding pair of lock nuts 16.

The bottom of each carrier 9 is releasably connected to a top cover plate 17 of a hollow box-section frame portion 18 that extends substantially horizontally parallel to the frame beam 1, 3 and 5 throughout most of the working width of the harrow. The hollow frame portion 18 has a substantially horizontally disposed bottom and substantially vertically disposed front and rear walls that are connected to the leading and rear edges of said bottom by obliquely inclined portions. The upper edges of the front and rear walls are bent over to form substantially horizontal outwardly directed rims, the top cover plate 17 of the frame portion 18 being releasably secured to said rims by a number of small bolts 19 appropriately positioned ones of which bolts 19 also releasably secure the frame portion 18, including its top cover plate 17, to the two carriers 9. Gasket strips 20 (FIGS. 4 and 5) are arranged between the rims of the hollow frame portion 18 and the edges of its top cover plate 17 to prevent leakage of lubricant from, and the penetration of dirt into, the interior of the frame portion 18.

The flat substantially horizontally disposed bottom of the hollow frame portion 18 is formed with a row of six circular holes whose center are spaced apart from one another at regular intervals which preferably, but not essentially, have magnitudes of substantially 50 cms. Six substantially vertical, or at least upwardly extending, shafts 21 are entered upwardly through the six corresponding holes, each shaft 21 being formed, substantially mid-way along its axial length, with an enlarged diameter portion 22. Upper and lower ball bearings 23 surround each shaft 21 immediately above and beneath the corresponding portion 22, the outer races of the two ball bearings 23 of each pair being arranged in corresponding upper and lower bearing housings 27 and 24, respectively. Each lower bearing housing 24 has an upright rim which extends upwardly just into the corresponding circular hole in the bottom of the frame portion 18 and also includes a flange 25 that projects substantially radially outwardly away from said rim in parallel relationship with the bottom of the hollow frame portion 18 and abutting contact with the lower surface thereof. It will, however, be seen from FIGS. 4 and 5 of the drawings that each flange 25 includes an outer frusto-conical rim 26 that is of upwardly and inwardly tapering configuration, the junction between the upper edge of said rim and the integral outer edge of the planar flange 25, proper, having a diameter whose magnitude is substantially the same as the fore and aft width of the substantially flat bottom of the hollow frame portion 18. Each upper ball bearing 23 is located at substantially the top of the corresponding bearing housing 27, the bottom of that housing 27 being formed with a downwardly projecting cylindrical rim which is a close fit just inside the upright rim of the corresponding lower bearing housing 24. The lower circular edge of said rim of each upper bearing housing 27 abuts against the top of the outer race of the corresponding lower ball bearing 23. Each upper bearing housing 27 has a flange 28 close to its lower end, the lower surface of said flange being in contact with the upper surface of a bottom portion of a dished plate 29 that extends inside the hollow frame portion 18 throughout substantially the whole of the transverse length thereof. The lower surface of the bottom portion of the dished plate 29 bears against the upper surface of the bottom of the frame portion 18 and it will be seen from the drawings that substantially vertically disposed bolts 30 are entered through holes in each flange 26, the corresponding flange 28 and the intervening plate 29 and frame portion (18) bottom to fasten those parts securely, but releasably, to one another.

The dished plate 29 acts to strengthen the frame portion 18 and its bottom portion, which is also flat, is bent over upwardly at locations which register with the front and rear edges of the flat bottom of the immediately underlying frame portion 18 to form obliquely upwardly extending portions that are inclined to the horizontal at a considerably larger angle than are the neighbouring oblique portions of the frame portion 18. The obliquely upwardly extending portions of the dished plate 29 are again bent over, at substantially the same horizontal level as the junctions between the upright front and rear walls of the frame portion 18 and the underlying oblique portions thereof, to form front and rear substantially horizontal portions that are in parallel or substantially parallel relationship with the top cover plate 17 of the frame portion 18. The free extreme leading and rear edges of the dished plate 29 are located very close to, but not actually in contact with, the internal surface of the front and rear walls of the hollow frame portion 18 (see FIG. 5). Strengthening ribs 31 that are of substantially right-angled triangular configuration rigidly interconnect the upper surface of the flange 28 of each upper bearing housing 27 and the external surface of the curved wall of the main substantially cylindrical body of that housing 27.

A lower splined portion of each shaft 21 projects downwardly from beneath the corresponding lower bearing housing 24 and co-operates with the internally splined hub 32 of a carrier or support that is generally indicated by the reference 33, said carrier or support 33 forming a part of a corresponding rotary soil working member that is generally indicated by the reference 34. Each carrier or support 33 is provided with three tines 35 which are spaced apart from one another at regular 120° intervals around the longitudinal axis of the shaft 21 concerned. The upper end of each carrier hub 32 is located inside the bottom of the corresponding lower bearing housing 24 and actually abuts against the lower surface of the inner race of the co-operating lower ball bearing 23. Each such hub 32 is formed with a flange 36 at a level just beneath that of the bottom of the corresponding lower bearing housing 24, the outer edge of the circular flange 36 being integrally connected to the smaller diameter lower edge of a downwardly tapering frustoconical rim 37. It will be seen from FIG. 5 of the drawings that the upper free edge of each rim 37 is located in very closely spaced relationship with the lower edge of the corresponding non-rotary rim 26, said rims co-operating to form protective elements for fastening members, in the form of bolts 45, of the carriers 32 which bolts 45 will be referred to again below.

The lower end of each hub 32 is of upwardly tapering frusto-conical conficuration and receives, with some clearance, a matchingly shaped upwardly recessed central portion of a corresponding locking plate each locking plate 38 accommodates the head of a fastening bolt 38A whose shank is screwed into a matchingly threaded axial bore in the lower splined portion of the corresponding shaft 21, said bore opening at the extreme lower end of that shaft 21. It will be seen from FIG. 6 of the drawings that each locking plate 38 is of a hexagonal shape having three longer sides of equal length and three shorter sides of equal length that are arranged in alternate relationship around the periphery of the plate. It is preferred, but it is not essential, that the length of each longer side should be substantially twice that of each shorter side. Three pairs of inner and outer spring steel strips 39 and 40 are retained between the lower surface of each flange 36 and the upper surface of the corresponding locking plate 38. The two strips 39 and 40 of each pair lie alongside each other and each strip is so disposed that, as seen in cross-section, the longer parallel edges of that section are in parallel are substantially parallel relationship with the longitudinal axis of the corresponding shaft 21. The two strips 39 and 40 of each pair are angularly bent to form brackets, said strips thus having central rectilinear webs or bases 41 and 42, respectively, from the opposite ends of which webs or bases project outwardly divergent rectilinear limbs 43, and rectilinear limbs 44, respectively. The webs or bases 41 and 42 are integrally connected to the limbs 43 and 44 by sharp bends that have angular magnitudes of substantially 150°. It will be seen from FIG. 6 of the drawings that the webs or bases 41 and 42, the limbs 43 and 44 and the longer sides of the locking plates 38 are all of substantially the same length.

The pairs of strips 39 and 40 are arranged around each hub 32 in such a way that the webs or bases 41 of the three inner strips 39 bear tangentially against the outer surface of that hub 32 while each pair of rectilinear limbs 43 and 44 projects substantially radially outwardly with respect to the longitudinal axis of the corresponding shaft 21 in abutting engagement with a second pair of rectilinear limbs 43 and 44, it being the two inner limbs 43 concerned that actually make surface-to-surface contact with one another. The three groups that each comprise two limbs 43 and two limbs 44 thus project substantially radially with respect to the longitudinal axis of the corresponding shaft 21 at substantially 120° intervals around that axis. One of the aforementioned tines 35 is firmly but releasably mounted at the radially outer end of each of the three limb groups or arms, that has just been described, of each carrier or support 33, at three tines 35 of each rotary soil working member 34 thus also being spaced apart from one another at substantially 120° intervals around the longitudinal axis of the shaft 21 concerned. Each of the carriers or supports 33 is provided with six of the aforementioned bolts 45 and it will be seen from FIG. 6 of the drawings that said bolts 45 are positioned at the sharp angular bends between the opposite ends of the webs or bases 42 of the outer strips 40 and the radially inner ends of the corresponding rectilinear limbs 44. Once the bolts 45 are tightened, the spring steel strips 39 and 40 are reliably, but readily releasably, retained in their appointed positions.

The rectilinear limbs 43 of the inner strips 39 are, in fact, a little shorter in length than are the rectilinear limbs 44 of the outer strips 40, the two limbs 44 of each group of four limbs being curved towards one another at their free ends where they project short distances beyond the adjacent free ends of the co-operating limbs 43. Spaces are thus produced which form part of holders for fastening portions 46 of the tines 35. Each holder also comprises an upper clamping plate 47 and a lower clamping plate 48. Each upper clamping plate 47 has a downwardly directed rim and each lower clamping plate 48 has an upwardly directed rim, said rims embracing the curved outer end regions of the corresponding limbs 44 so as to subtend an angle of not less than substantially 180° at the longitudinal axis of the corresponding tine fastening portion 46. It will be seen from the foot of FIG. 6 of the drawings that each pair of clamping plates 47 and 48 actually extends radially inwardly towards the corresponding shaft 21 to a location that is just inwards of the extreme outer free ends of the two limbs 43 of the corresponding limb group. Each upper clamping plate 47 has a substantially central opening that is formed with a downwardly tapering frusto-conical wall which is arranged to co-operate with a matchingly tapered frusto conical portion of a fastening nut 49 that is mounted on a screwthreaded upper end part of the fastening portion 46 of the corresponding tine 35. The lower clamping plate 48 of each pair of plates 47 and 48 also has a central aperture which is surrounded, through more than 180°, by a downwardly projecting rim 50. The rim 50 is formed with two diametrically opposed notches or grooves 51 each of which receives a corresponding lug or tooth 52 that is formed integrally on the fastening portion 46 of the corresponding tine 35 at a location that is at, or near to, the lowermost end of said portion 46. The aperture in each lower clamping plate 48 has fastening portion 46 of the corresponding tine 35 entered upwardly through it when the rotary soil working member 34 concerned is assembled and said aperture has an upwardly directed wall that co-operates with a shoulder 53 formed on the corresponding tine 35 near the lowermost end of this fastening portion 46, said wall also embracing lower edge regions of the two outer strips 40 of the corresponding group of four strips 39 and 40 in such a way that the plate 48 cannot turn about the longitudinal axis of the corresponding tine fastening portion 46. Thus, when each fastening nut 49 is tightened, the co-operation between the corresponding lugs or teeth 52 and the notches or grooves 51 in the respective lower clamping plate 48 prevents the tine 35 concerned from turning about the axis of its fastening portion 46 in its holder.

The lower end of the shoulder 53 of each tine 35 makes an integral junction with a soil working portion 54 of that tine. Both the fastening portion 46 and the soil working portion 4 of each tine 35 are straight but said two portions are relatively inclined in such a way that an angle of substantially 8° is enclosed between their longitudinal axes at the integral junction of the two portions. For most harrowing and cultivating purposes, the tines 35 are so disposed in their holders that the soil working portions 54 thereof trail rearwardly from top to bottom with respect to the intended directions of operative rotation of the corresponding soil working members 34. A lower region of the soil working portion 54 of each tine 35, which region comprises a major part of the length of said portion 54, tapers downwardly toward the lowermost free end or tip of the portion 54 and has a substantially rhombic cross-section, the longer diagonal of the substantially rhombic cross-section being in substantially tangential relationship with an imaginary circle that is centred upon the axis of rotation of the corresponding soil working member 34. The leading and rear corners of the substantially rhombic cross-section region of each tine portion 54 are shaped to form ribs and the four what would otherwise be flat sides of each such region are formed throughout major portions of their widths with grooves that extend lengthwise of said regions of the portions 54 to the lowermost free ends or tips thereof.

Figure 4:
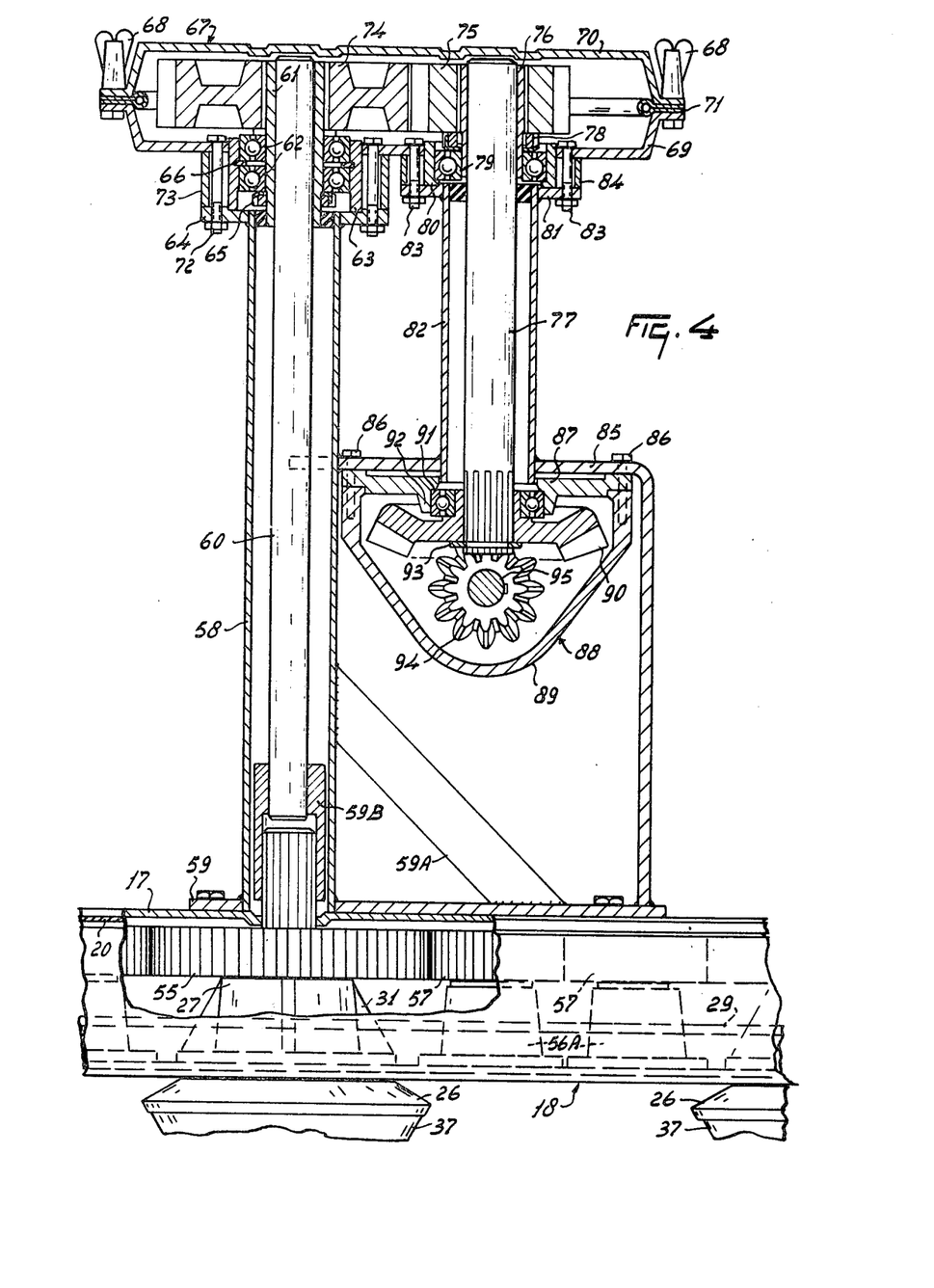
FIG. 4 is principally a section, to an enlarged scale, taken on the line IV—IV in FIG. 1.

Each shaft 21 is formed with splines throughout the length thereof that extends above the corresponding enlarged diameter portion 22 and said splines co-operate with the internally splined hub of a corresponding straight-toothed or spur-toothed pinion 55. The lower end of the hub of each pinion 55 abuts against the top of the inner race of the corresponding upper ball bearing 23, all of the six pinions 55 that are provided in the example which is being described being located wholly inside the hollow frame portion 18 at a level just beneath the top cover plate 17 thereof. Between each neighbouring pair of shaft 21, two further substantially vertical, or at least upwardly extending, shafts 56 are provided, said shafts 56 being in parallel relationship with the shafts 21 and the longitudinal axes of all of said shafts 21 and 56 being contained in a common vertical or substantially vertical plane that is substantially perpendicular, or at least transverse, to the direction A. The two shafts 56 of each pair are spaced apart from one another by the same distance and each shaft 56 is spaced from the nearest shaft 21 by the same distance, the latter distance being, however, greater than the distance between the two shafts 56 of each pair themselves. Each shaft 56 is rotatably mounted in ball bearings (not visible) that are carried by corresponding bearing housings 56A (FIG. 4) that are secured to the frame portion 18. Each shaft 56 has mounted on it, by way of interengaging splines, a corresponding straight-toothed or spur-toothed pinion 57, all of the pinions 57 being of the same effective diameter which is half the effective diameter of each of the larger pinions 55. As can be seen in FIGS. 1 and 4 of the drawings, the row of single pinions 55 and alternating pairs of pinions 57 is so arranged that the teeth of each pinion in said row are in meshing engagement with those of the immediately neighbouring pinion, or those of both of the two immediately neighbouring pinions, in said row. The arrangement is such that each pinion 55, together with the corresponding shaft 21 and soil working member 34, will revolve, during the use of the rotary harrow, in a direction that is opposite to the direction of rotation of the next pinion 55, shaft 21 and member 34 along said row, these intended directions of operative rotation being indicated by small arrows in FIG. 1 of the drawings.

Figure 5:
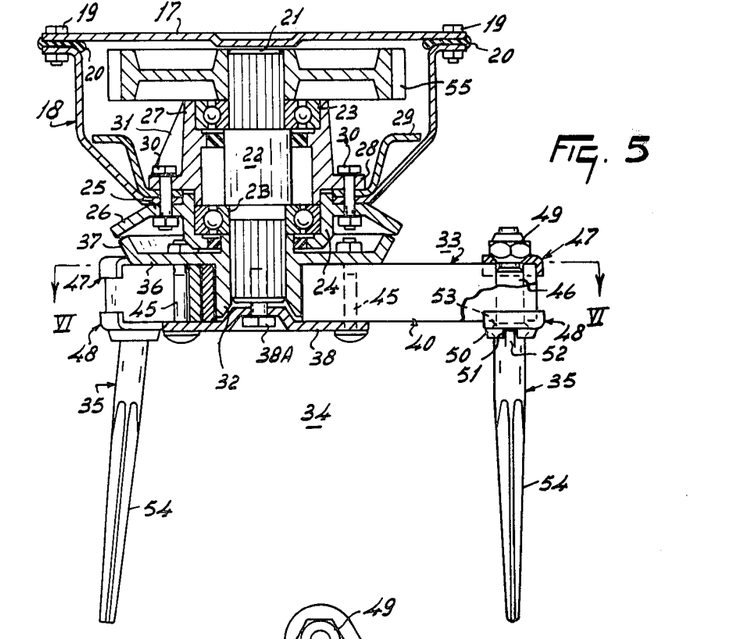
FIG. 5 is a section, to an enlarged scale, taken on the line V—V in FIG. 1
Figure 6:
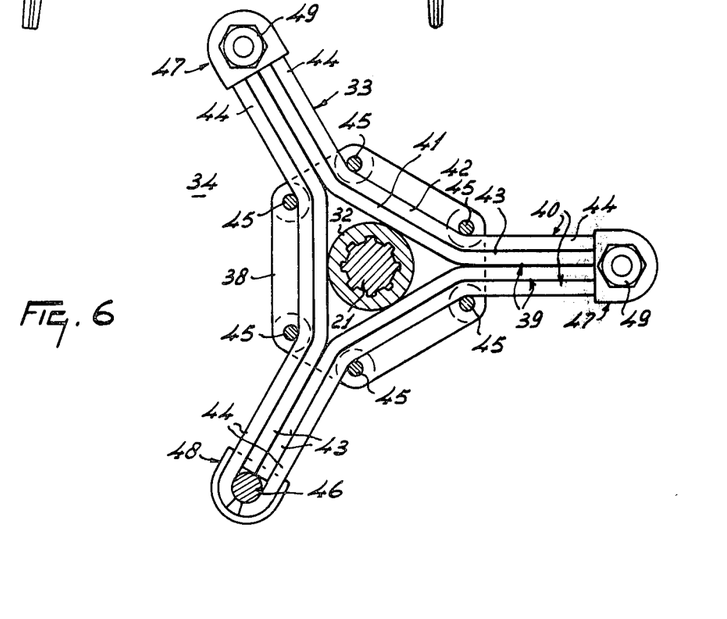
FIG. 6 is a section taken on the line VI—VI in FIG. 5.

It can be seen in FIG. 5 of the drawings that the upper end of each shaft 21 is located in very closely spaced relationship beneath the bottom of a corresponding shallow depression that is formed in the top cover plate 17 of the frame portion 18. The upper ends of the hubs of the pinions 55 are similarly spaced from the bottoms of said depressions, the latter thus acting to prevent the pinion 55 from being displaced upwardly along the shafts 21 to any significant extent. However, any pinion 55 can readily be removed from its shaft 21, when required, merely by temporarily taking off the top cover plate 17. One of the center pair of six shafts 21 has an upward extension through a hole in the top cover plate 17 (see FIG. 4) and projects axially into the lower end of a substantially vertical, or at least upwardly extending, tube 58. The lower end of the tube 58 is welded or otherwise rigidly secured in a hole in a plate 59 that is fastened to the top cover plate 17 of the hollow frame portion 18 in flat abutting relationship with that cover plate 17. An obliquely disposed bracing strip 59A has its opposite ends welded to the top of the plate 59 and to one side of the tube 58 and thus considerably strengthens the perpendicular connection between those parts. The upward extension of one of the shafts 21 that can be seen in FIG. 4 of the drawings is splined and said splines cooperate with matching splines inside a socket 59B. The upper end of the socket 59B is a force fit on the lower end of a torsionally deformable spring steel shaft 60 whose diameter, in the example that is being described, is substantially 35 mms and whose axial length is substantially 600 mms. An upper end region of the shaft 60 projects axially above the upper end of the surrounding tube 58, said region being provided, again by force fitting, with a surrounding sleeve 61. In fact, the sleeve 61 surrounds the upper region of the shaft 60 between a level that is just beneath the top of the tube 58 and a level that is marginally beneath the extreme upper end of the shaft 60. The sleeve 61 is surrounded, towards its lower end, by the inner races of a pair of closely neighbouring ball bearings 62, the outer races of the same ball bearings 62 being received in a surrounding housing 63. The bottom of the housing 63 abuts against the upper surface of a flange 64 that is welded to the upper end of the tube 58. A lower end region of the sleeve 61 is screwthreaded and receives a nut 65 against the upper surface of which abuts the lower end of the inner race of the lower one of the two ball bearings 62. The outer edge of a circlip 66 is received in a groove in the internal wall of the bearing housing 63 and said circlip 66 lies between the outer races of the two ball bearings 62 in contact with both those outer races. The upper ball bearing 62 projects by a short distance above the top of the bearing housing 63.

The top of the bearing housing 63, and thus part of the upper ball bearing 62, is located just inside an opening in the bottom of a flat casing of a change speed-gear 67. Said casing comprises lower and upper portions 69 and 70 that are of substantially symmetrically identical formation except for the provision, in the lower portion 69, of opening one of which has already been mentioned above. The upper portion 70 is releasably secured to the lower portion 69, at inter-engaging marginal rims of said two portions, by wing nuts 68, a synthetic plastics or other gasket 71 being sealingly sandwiched between the inter engaging rims when the wing nuts 68 are tightened. Substantially vertically disposed bolts 72 frimly but releasably secure a lower substantially horizontal wall of the lower portion 69 of the change-speed gear 67 to the flange 64 at the upper end of the tube 58, a spacing and screening ring 73 being arranged around the bolts 72 between the periphery of the flange 64 and the underneath surface of said lower wall of the change-speed gear portion 69. There are several of the bolts 72, said bolts being arranged around the external surface of the bearing housing 63 is closely spaced apart relationship with that surface.

The external surface of the sleeve 61 is provided, inside the change-speed gear 67, with axially extending splines and said splines are arranged to co-operate with matching splines in the hub of a straight-toothed or spur-toothed pinion 74. The teeth of the pinion 74 that is located inside the change-speed gear 67 are in driven mesh with those of a second smaller straight-toothed or spur-toothed pinion 75 whose hub co-operates, by way of interengaging splines, with a sleeve 76 that tightly surrounds an upper end region of a driving shaft 77 which extends downwardly from the interior of the change-speed gear 67 through an opening in the bottom wall of the lower portion 69 of that gear 67 in parallel relationship with the torsionally deformable spring steel shaft 60. The bottom of the hub of the pinion 75 bears against the top of a spacing ring 78 that surrounds the driving shaft 77, the bottom of the spacing ring 78 abutting, in turn, against the top of the inner race of a ball bearing 79 wich race surrounds the lower end of the sleeve 76. The ball bearing 79 is accommodated in a housing 80 that surrounds its outer race the upper end of the housing 80 fitting in a second aperture in the bottom wall of the lower portion 69 of the change-speed gear 67. The bottom of the bearing housing 80, which has an internal lip for co-operation with the outer race of the ball bearing 79, abuts against the upper surface of a flange 81 that is weleded or otherwise rigidly secured to the upper end of a tube 82 that projects downwardly from substantially the level of the bottom of the housing 80 in concentrically surrounding relationship with a major portion of the length of the driving shaft 77. However, the tube 82 has a considerably shorter axial length than does the tube 58, the lower end of the tube 82 being disposed at a level above that of the midpoint of the tube 58. A spacing and screening ring 84 extends between the periphery of the flange 81 and the underneath surface of the bottom of the lower portion 69 of the change-speed gear 67, a number of substantially vertically disposed bolts 83 that are located radially inwardly of the ring 84 being provided to clamp the flange 81 firmly but releasably to the change-speed gear 67. The bolts 83 and spacing ring 84 are arranged in the same general manner relative to the bearing housing 80 as are the previously described bolts 72 and ring 73 relative to the bearing housing 63, the axial length of the parts 80, 83 and 84 being, however, considerably less than the axial length of the parts 63, 72 and 73.

The lower end of the tube 82 is welded or otherwise rigidly secured into a hole in the top of a substantially horizontally disposed support 85. One side of the support 85 is welded or otherwise rigidly secured to the external surface of the tube 58 at a level which is a short distance above that of the mid-point of that tube. The support 85 is thus in parallel or substantially parallel relationship with the plate 59 that lies at some distance beneath it. That side or edge of the support 85 which is remote from the tube 58 is bent over through 90° to form a downwardly extending portion whose lowermost edge is welded or otherwise rigidly secured to the upper surface of the plate 59 close to the edge of the latter. The extreme lowermost end of the tube 82 is entered, just beneath the support 85, into a hole in the substantially flat top 87 of a gear box 88. An underlying substantially trough-shaped portion 89 of the bear box 88 is secured to its top 87, and to the overlying support 85, by a number of substantially vertically disposed bolts 86 and it will be seen from FIG. 4 of the drawings that the lowermost end of the driving shaft 77 projects downwardly beneath the corresponding and of its surrounding tube 82 into the interior of the gear box 88 where it is splined to carry a bevel pinion 90. The matchingly splined hub of the bevel pinion 90 has an uppermost portion of reduced diameter around which is arranged the inner race of a ball bearing 91. The outer race of the same ball bearing 91 is arranged in a housing 92 that is in the form of a downwardly projecting portion of the top 87 of the gear box 88. A circlip 93 whose inner edge is engaged in a groove that is formed in the driving shaft 77 very close to the lowermost end of that shaft retaines the bevel pinion 90 in its appointed axial position on the splined region of the shaft 77, the teeth of the pinion 90 that are, at any instant, at the rear of the pinion with respect to the direction A, (see FIG. 2) being in driven mesh with those of a bevel pinion 94 which is of smaller size than the bevel pinion 90. The hub of the bevel pinion 94 is keyed to a rotary input shaft 95 that extends substantially horizontally parallel to the direction A through the gear box 88 to project beyond both the front and rear walls of that gear box. The projecting ends of the shaft 95 are splined and the leading projecting end can be placed in driven connection with the rear power take-off shaft of an agricultural tractor or other operating vehicle through the intermediary of a telescopic transmission shaft 96, which is of a construction that is known per se, having universal joints at its opposite ends. The spline rearwardly projecting end of the shaft 95 can be used as a source of rotary power for the moving parts of some other tool, implement or machine that may be disposed behind the rotary harrow with respect to the direction A for use in combination, or conjunction, with that harrow. It will have been noted that the upper portion 70 of the change-speed gear 67 can readily be removed from the lower portion 69 thereof merely by remporarily releasing the wing nuts 68. The two pinions 74 and 75 are of different sizes and thus provide a corresponding transmission ratio between the driving shaft 77 and the torsionally deformable spring steel shaft 60. The two pinions 74 and 75 can be interchanged in position on the sleeves 61 and 76 that correspond to the two shafts 60 and 77 and, moreover, at least one other pair of cooperating pinions that are similar to the pinions 74 and 75, except as regards their sizes, in preferably provided. Thus, the transmission ratio between the shaft 77 and the shaft 60 will depend upon the particular pair of pinions that is chosen for use in the change-speed gear 67 and the particular arrangement thereof that is selected on the splined sleeves 61 and 76. The speed at which the soil working members 34 will revolve can thus be increased, or decreased, as may be desired without having to change the speed of driving rotation that is applied to the forwardly projecting end of the rotary input shaft 95. The speed of rotation that is chosen will usually depend upon the nature and condition of the soil that is to be dealt with and the particular purpose for which that soil is required after treatment.

Two downwardly projecting lugs 97 are provided at the opposite ends of the frame beam 1 and each lug has a corresponding arm 90 pivotally connected to it by a respective pin 98, the two pivot pins 98 being substantially horizontally aligned in a direction that is parallel to the length of the frame beam 1. The arms 99 extend generally rearwardly with respect to the direction A from the corresponding pivot pins 98 and each of them is formed, at some distance in front of the rearmost end thereof, but behind the frame portion 18 with respect to the direction A, with a hole for the reception of a corresponding substantially horizontally disposed bolt 100. Strips 102 project downwardly towards the ground from the opposite ends of the rear frame beam 5 and each strip is formed with a corresponding curved row of holes 101, all of the holes 101 being equidistant from the substantially horizontal axis that is defined by the pivot pins 98. The holes in the arms 99 that have been mentioned above are at the same distance from said axis and the bolts 100 can therefore be entered through the holes in the arms 99 and chosen one of the holes 101 in the corresponding rows by turning the arms 99 upwardly or downwardly, as may be required, about the respective pivot pins 98. Once the bolts 100 are tightened, the arms 99 are retained firmly and reliably in corresponding angular settings about the axis that is defined by the pivot pins 98. A combined supporting member and soil crumbling member of the rotary harrow in the form of a ground roller 103 of open cage-like construction is mounted in a freely rotatable manner between substantially horizontally aligned bearings that are carried at the extreme rearmost ends of the two arms 99, the substantially horizontal axis of rotation of the roller 103 thus being parallel to the frame beams 1, 3 and 5 and substantially perpendicular, or at least transverse, to the direction A. The roller 103 comprises a central axially extending support shaft, that is preferably of tubular construction, to which support shaft a plurality, such as five, of circular support plates 105 are secured at regularly spaced apart intervals along the length of the roller, two of the support plates 105 being located very close to the opposite axial ends of said roller 103. The support plates 105 are substantially vertically disposed in parallel relationship with one another and parallel or substantially parallel relationship with the direction A. Each support plate 105 is formed close to its edge with a plurality, such as eight, of holes that are regularly spaced apart from one another around the longitudinal axis of the roller 103. A corresponding number of elongate elements 104, that are formed from solid rod-shaped or tubular material, are entered lengthwise through the holes in the plates 105 so as to extend helically around the axis of rotation of the roller 103 throughout substantially the whole of the axial length of that roller.

Each arm 99 carries a corresponding protective member in the form of a shield 106 that extends throughout very nearly the whole of the length of the arm 99 concerned and that is afforded by a substantially vertically disposed plate that is in parallel or substantial parallel relationship with the direction A. Each shield 106 has a straight substantially horizontally disposed lower or bottom edge which is preferably in the form of a rim (not visible) that is arranged to slide forwardly over the ground surface, usually with some penetration into that surface, in the direction A. The leading end of the straight lower edge or rim joins the lower end of an upwardly and forwardly curved edge whose convex side faces forwardly with respect to the direction A. The rear end of each lower edge or rim, however, makes an angular junction with an upwardly and rearwardly directed straight edge which terminates alongside the bottom of the corresponding arm 99. It is readily apparent from FIG. 2 of the drawings that the vertical extend of each shield 106 is greater towards the front thereof, with respect to the direction A, than it is towards the rear thereof.

Pairs of lugs 107 project downwardly from the lower surface of the frame beam 1 at positions which substantially register with the lower end of the two beams 2 that converge upwardly away from the top of the beam 1. Substantially horizontally aligned pivot pins 108 releasably interconnect the two lugs 107 of each pair and are arranged to have the free ends of the lower lifting links of a three-point lifting device or hitch at the rear of an agricultural tractor or other operating vehicle connected to them in the generally known manner which is shown diagrammatically in FIGS. 1 and 2 of the drawings. It is noted that the axis which is defined by the pivot pins 108 is coincident, or substantially coincident, with the axis that is defined by the pivot pins 98. Two lugs 109 project upwardly from the top of the frame beam 3 at a location midway along the transverse length of the latter and are arranged to have the rear end of the upper lifting link of a three-point lifting device or hitch pivotally coupled to them by a releasable substantially horizontally disposed pivot pin 110 by which they are interconnected.

In the use of the rotary harrow which has been described, the lugs 107 and 109 and the pivot pins 108 and 110 are employed in connecting the frame to the three-point lifting device or hitch of an agricultural tractor or other operating vehicle and the known telescopic transmission shaft 96 that has universal joints at its opposite ends is used to place the rear power take-off shaft of the same tractor or other vehicle in driving connection with the forwardly projecting end of the rotary input shaft 95. The speed at which the soil working members 34 will revolve in response to a substantially constant applied driving speed of rotation is adjusted, if required, before work commences by appropriately positioning the pinions 74 and 75, or an alternative pair of pinions of different sizes, in the change-speed gear 67. The maximum depth to which the tines 35 of the soil working members 34 can penetrate into the ground is adjusted, if required, by turning the arms 99 upwardly or downwardly about the pivot pins 98, employing the bolts 100 to maintain the chosen setting. This adjustment determines the level of the axis of rotation of the roller 103 relative to that of the frame portion 18 which frame portion, of course, supports the rotary soil working members 34. As the harrow moves operatively in the direction A over land that is to be cultivated, the soil working members 34 are driven in the directions that are indicated by the arrows in FIG. 1 of the drawings through the drive transmission that is contained in the hollow frame portion 18, the change-speed gear 67 and the gear box 88, it being particularly noted that the drive between the change-speed gear 67 and the parts that are contained within the hollow frame portion 18 comprises substantially only the torsionally deformable spring steel shaft 60. The effective working diameter of each member 34 is a little greater than is the spacing between the longitudinal axes of immediately neighbouring shafts 21 so that, during operation, the neighbouring contra-rotating members 34 work individual strips of land that overlap one another to form, in effect, a single broad strip of worked soil. The rotary harrow that has been described is particularly suitable for use in cultivating land which contains an above average quantity of stones and, possibly, other hard objects. If such a stone or other hard object should become momentarily jammed between any of the rapidly moving tines 35, the spring steel strips 39 and 40 of the corresponding carriers or supports 33 can deflect resiliently thus allowing the tines 35 concerned to yield resiliently through short distances in directions that are substantially tangential to imaginary circles that are centered upon the axes of rotation of the corresponding shafts 21. Any momentarily jammed stone will therefore almost always be released without causing any significant damage. Another precaution against damage to the soil working members 34 and the transmission parts within the hollow frame portion 18 resides in the inclusion in the drive transmission of the torsionally deformable spring steel shaft 60. Finally, it is noted that the whole frame portion 18, together with the soil working members 34, the change-speed gear 67 and the gear box 88 can tilt upwardly relative to the frame beams 1, 3 and 5 about the axis that is defined by the substantially horizontally aligned pivot pins 8 against the action of the compression springs 15 which tend normally to maintain the frame portion 18 in the illustrated position in which the rear ends of the webs or bases of the two carriers 9 bear downwardly against the upper surfaces of the two lugs 12. This provision for upward deflectability of the frame portion 18 and the parts which it carries is particularly advantageous in the event of the tines 35 of one or more of the members 34 coming into contact with rocks or other obstacles that are quite deeply buried in the soil that is to be cultivated. The single substantially horizontal axis that is defined by the pivot pins 8 is, it will be noted from FIGS. 1 and 2 of the drawings, in advance of both the frame portion 18 and the soil working members 34 with respect to the direction A. The vertically or substantially vertically disposed plates that afford the shields 106 which are connected to the two arms 99 co-operate with the tines 35 of the two soil working members 34 that are located at the opposite ends of the row of those soil working members and ensure that the soil at the margins of the broad strip of ground that is worked by the harrow is efficiently crumbled to substantially the same extent as is soil which lies closer to the centre of that strip. When the arms 99 are displaced upwardly or downwardly to change the maximum working depth of the tines 35 of the soil working members 34, the two shields 106 are moved upwardly or downwardly with said arms 99 and thus automatically match the newly established maximum working depth of the tines 35. The rotary harrow which has been described is constructed and arranged to provide a particularly effective protection against bending or breakage of the tines 35, damage to the fastening portions 46 of those tines and the holders in which they are releasably secured, and overloading of the parts of the drive transmission which rotate the soil working members 34 when the harrow is in use. The provision of these protective measures is particularly important when the rotary harrow is to be used in the cultivation of soil which contains a larger than usual proportion of stones.

What is claimed is:

1. A soil cultivating implement comprising at least one soil cultivating member that is rotatable about an upwardly extending axis defined by a respective shaft and driving means connected to rotate said member about said axis, said member comprising a support and downwardly extending tine means fastened to a plurality of pairs of resilient, interengaging strips of said support, said tine means including at least one tine having an upper fastening portion, inner limbs of said pairs of strips being shorter in length than outer limbs of the corresponding strips of the same pairs, said outer limbs being bent over towards one another at outer ends thereof to comprise respective parts of holders for said tines, further parts of said holders being plate means clamping said outer ends to secure said strips in position, said plate means cooperating with said fastening portion of the tine.

2. An implement as claimed in claim 1, wherein said member comprises a plurality of tines and respective upper and lower clamping plates for each tine fastening portion, said plates having rims that partly surround portions of said strips.

3. An implement as claimed in claim 2, wherein said rim has a curved configuration and subtends an angle of substantially 180°.

4. An implement as claimed in claim 2, wherein each lower clamping plate co-operates with the lower end of the fastening portion of the corresponding tine, each upper clamping plate co-operating with a frusto-conical region of a screwthreaded fastening nut that is received on a screwthreaded end of the fastening portion of the corresponding tine, said lower clamping plate having diametrically opposed notches that receive lugs at substantially the lower end of said fastening portion.

5. An implement as claimed in claim 1, wherein said strips are positioned with their widths in upwardly extending directions and said strips are clamped between a flange of a hub of the support and an underlying locking plate.

6. An implement as claimed in claim 5, wherein the locking plate is hexagonal in configuration and has alternate longer and shorter edges.

7. An implement as claimed in claim 6, wherein each longer edge has substantially twice the length of each shorter edge.

8. An implement as claimed in claim 6, wherein said strips are angularly bent to form brackets and each bracket comprises a rectilinear base with rectilinear limbs diverging from the opposite ends of said base, said base having a length substantially the same as that of one of the longer edges of said locking plate.

9. An implement as claimed in claim 8, wherein said support comprises three pairs of said strips which successively interengage one another through angular bent limbs that form groups, the interengaging groups of angularly bent limbs comprising arms that extend substantially radially with respect to said shaft and the bases of the strips abutting against a central hub of the corresponding soil working member.

10. An implement as claimed in claim 9, wherein the arms formed by interengaging strips register with the shorter edges of said locking plate.

* * * * *